United States Patent [19]

Sugarman et al.

[11] Patent Number: 5,796,640

[45] Date of Patent: Aug. 18, 1998

[54] DIETARY FAT CONTROL AUTOMATIC CALCULATOR SYSTEM AND FOLD LABEL FAT EVALUATOR

[76] Inventors: Henry Sugarman; Marcia S. Sugarman, both of 2834 S. Extension, Unit 2092, Mesa, Ariz. 85210

[21] Appl. No.: 493,258

[22] Filed: Jun. 21, 1995

Related U.S. Application Data

[63] Continuation-in-part of Ser. No. 45,507, Apr. 8, 1993, which is a continuation-in-part of Ser. No. 986,427, Dec. 3, 1992, abandoned.

[51] Int. Cl.$^6$ .................................................... G06F 3/00
[52] U.S. Cl. ........................... 364/709.02; 364/413.29
[58] Field of Search .................... 364/709.02, 709.03, 364/715.01, 413.29

[56] References Cited

U.S. PATENT DOCUMENTS

| | | | |
|---|---|---|---|
| 3,572,584 | 3/1971 | Weaver | 235/88 R |
| 3,596,066 | 7/1971 | Spiteri | 235/114 |
| 3,841,260 | 10/1974 | Sharp | 116/325 |
| 4,048,477 | 9/1977 | Hungerford | 235/88 R |
| 4,100,401 | 7/1978 | Tutt | 377/49 |
| 4,144,568 | 3/1979 | Hiller | 364/410 |
| 4,151,668 | 5/1979 | Hungerford | 40/495 |
| 4,192,000 | 3/1980 | Lipsey | 364/413.29 |
| 4,212,079 | 7/1980 | Segar | 364/413.29 |
| 4,244,020 | 1/1981 | Ratcliff | 364/413.29 |
| 4,321,674 | 3/1982 | Krames et al. | 364/413.29 |
| 4,380,802 | 4/1983 | Segar | 364/413.29 |
| 4,464,122 | 8/1984 | Fuller | 434/262 |
| 4,575,804 | 3/1986 | Ratcliff | 364/709.03 |
| 4,855,942 | 8/1989 | Bianco | 364/561 |
| 4,894,793 | 1/1990 | Ikemoto | 364/709.03 |
| 5,215,130 | 6/1993 | Kojima et al. | 141/105 |

Primary Examiner—Reba I. Elmore
Assistant Examiner—Emmanuel L. Moise
Attorney, Agent, or Firm—LaValle D. Ptak

[57] ABSTRACT

A relatively small, compact, portable, hand-held, pre-programmed, dedicated, automatic calculator for dietary fat control, having a limited number of data enter keys, a cusom program, a memory for storing user-entered data, said program, and user prompts, a command and control system for executing said program to solve and evaluate automatic mathematical equations, and a display panel for showing user prompts, user-entered data and final results. With a first program the calculator solves for the percentage of fat calories, and evaluates for per serving contained in a given food item under evaluation using fat grams and total calories as inputs. In an alternate embodiment, a second programs allows the user to enter ones actual body weight or desired ideal body weight and it provides important results which disclose daily calorie intake allowance for a given body weight, determines the maximum daily fat grams intake allowance for that given body weight, and then the maximum daily saturated fat grams intake allowance for the given body weight.

6 Claims, 10 Drawing Sheets

5,796,640

DIETARY FAT CONTROL AUTOMATIC CALCULATOR SYSTEM AND FOLD LABEL FAT EVALUATOR

BACKGROUND

The present patent application is a Continuation-in-Part of U.S. patent application Ser. No. 08/045,507, filed on Apr. 8, 1993, which in turn is a Continuation-in-Part of U.S. patent application Ser. No. 07/986,427 filed on Dec. 3, 1992 (abandoned) by Henry Sugarman and Marcia S. Sugarman.

The present invention relates generally to a calculator system and method for providing dietary information, and more particularly, to a method and a pre-programmed, dedicated, automatic, calculator system for providing a user with dietary information concerning the percentage of fat calories per serving that is contained in a given food item under evaluation in order to assist the user in making purchasing and/or consumption decisions easier so that the user can avoid high fat foods which contribute to the health risks and weight control problems associated therewith.

An alternate embodiment of the present invention takes a user's actual or desired body weight and provides dietary information on the daily intake allowance of calories to maintain or reduce that body weight, and to determine the fat grams and saturated fat grams intake allowance for an overall healthier low fat lifestyle of that selected given body weight. A dual purpose calculator system is also provided for doing both of the above in a single system which enables the user to select therebetween.

The various health risks and health hazards associated with dietary intake have existed for many centuries, and the many problems related to the prevention of undesirable weight gain or to the reduction of body weight have probably been around for as long as man, with obesity consistently increasing.

In the last few decades, however, dietary control has mostly involved some type of direct or indirect calorie counting, usually associated with food-restrictive diets and strict diet menu planning. In most cases, once a person has lost weight and goes off ones low-calorie diet, he or she will soon begin eating the same way as before, and the lost weight is gained back. In fact, recent medical studies have shown that in all low-calorie "crash diet" programs, over 90% of those dieters who have lost weight have put it back on, and many with even more weight added in a period of time.

Many types of systems were designed to help count and monitor calories and facilitate calorie counting, including calorie counting calculators, calorie burning devices, diet menu planners, diet monitors, and the like. Other approaches to weight loss or weight control were also used, including exercise, jogging, weight machines, weight loss clinics, weight loss organizations, special diet drinks, special diet foods, diet supplements, and the like; but even with all such many and varies attempts, the weight problem has continued to grow to near catastrophic proportions today.

Examples of prior art patents aimed at providing some type of dietary information include the following:

U.S. Pat. No. 4,321,674 issued on Mar. 23, 1982 to Lester Krames for a "NUTRITIONAL VALUE ACCUMULATING AND DISPLAY DEVICE". This patent discloses a hand-held calorie counter, which is pre-programmed to enter pre-established numbers of calories (or other nutritional information) whenever a key, pre-identified with various food groups, is depressed. The number of calories entered is without regard to the actual numbers of calories which may be present or consumed. The Krames device accumulates a running total of the calories represented by the depression of the various pre-programmed keys.

U.S. Pat. No. 4,464,122 issued on Aug. 7, 1984 to Berkeley Fuller et al. for a "HEALTH POTENTIAL SUMMARY AND INCENTIVE SYSTEM". This patent is directed to a method of preparing a health potential analysis in various categories of health related information. Inquiries are presented to the subject who provides basic answers to the questions. From the answers, an analysis of the health potential summary is printed by the system.

U.S. Pat. No. 4,244,020 issued on Jan. 6, 1981 to Lloyd P. Radcliff for a "CALORIC AND/OR CARBOHYDRATE CALCULATOR". This convention, four-function calculator uses a plurality of given food and drink items which can be selected for input into the calculator, which then provides the user with the total number of calories and/or carbohydrates contained in each.

U.S. Pat. No. 4,380,802 issued on Apr. 19, 1983 to Richard B. Segar et al. for an "ELECTRONIC CALORIE COUNTER". This calculator computes the number of calories burned by a person, the number of calories consumed by a person, and the difference therebetween.

U.S. Pat. No. 4,575,804 issued on Aug. 8, 1982 to Lloyd P. Radcliff for a "DIET CALCULATOR". This system is for use in a kitchen to enable the user to quickly determine the number of calories, carbohydrates and/or protein in a given food item about to be consumed.

U.S. Pat. No. 4,578,942 issued on Feb. 9, 1984 to Edward C. Frederick for a "DEVICE FOR DETERMINING THE SPEED, THE DISTANCE TRAVELED, ELAPSED TIME AND CALORIES EXPENDED BY A PERSON WHILE RUNNING".

U.S. Pat. No. 4,855,942 issued on Oct. 28, 1987 to Frank J. Bianco for a "PEDOMETER AND/OR CALORIE-MEASURING DEVICE AND METHOD". In this system, the number of calories burned during exercise is computed.

U.S. Pat. No. 4,100,401 issued on Jul. 7, 1978 to Ugene F. Tutt for a "CALORIE COUNTER-CHRONOMETER". This calculator provides the number of calories being added, the calorie expenditure rate, and the net unconsumed calories for inputs of body weight, physical activity and calories consumed.

U.S. Pat. No. 4,144,568 issued on Mar. 13, 1978 to Frank M. Hardy et al. for an "EXERCISE RECORDER". This system uses sensors to read body motions and provide readouts in terms of calories burned.

U.S. Pat. No. 4,151,668 issued on May 1, 1979 to Daniel C. Hungerford for an "INDIVIDUAL WELL-BALANCED MEAL PLANNING DEVICE". This mechanical calculator enables people on a strict diet, such as diabetics, to expedite food selection for a complete meal which must have a predetermined calorie, carbohydrate and fat content.

U.S. Pat. No. 4,192,000 issued on Mar. 4, 1980 to Elmer M. Lipsey for an "ELECTRONIC CALORIE COUNTER". This device provides a readout of the rate of caloric consumption with exercise.

U.S. Pat. No. 4,212,079 issued on Jul. 8, 1980 to Richard B. Segar et al. for an "ELECTRONIC CALORIE COUNTER". This calculator compares calories burned versus calorie intake and provides an output of total calories burned and the real time values of calories burned.

U.S. Pat. No. 3,572,584 issued on Mar. 30, 1971 to Richard Paul Weaver et al. for a "WEIGHT REDUCTION CALCULATOR". Parameters such as age, weight and physical activity are converted into a maximum daily intake of calories.

U.S. Pat. No. 3,596,066 issued on Jul. 10, 1972 to George D. Baldwin et al. for a "DIET CALCULATING MACHINE". The user enters the caloric and carbohydrate content of various foods and determines and records the amount of calories and carbohydrates consumed during the course of an entire day.

U.S. Pat. No. 3,841,260 issued on Sep. 24, 1973 to Vance R. Sharp et al. for a "DIET MANAGEMENT DEVICE". This device allows a dieter to keep track of the consumption of allowable food stuffs over a 24 hour period.

U.S. Pat. No. 4,048,477 issued on Sep. 13, 1977 to Daniel C. Hungerford for a "WEIGHT CONTROL CALCULATOR". This system uses a series of rotatable mechanical disks to determine the maximum daily intake of calories allowed to maintain a given body weight or to lose a particular number of pounds.

U.S. Pat. No. 4,894,793 issued on Jan. 16, 1990 to Yutaka Ikemoto et al. for a "CALORIE CALCULATOR WITH MENU RETRIEVAL FUNCTION". This system gives the calorie count for a given menu item.

None of the prior art represented above, or any of the other prior art known to applicants is even remotely concerned with the disclosure of proper fat calories and saturated fat intake allowance determined by ones daily calorie intake; and none depicts even a partial solution to the present national problem of obesity and/or the avoidance of high fat related life-threatening health risks, hazards, diseases or illness.

Furthermore, none of the prior art cited above, or the other prior art known to applicants even remotely relates to a relatively small, compact, portable, hand-held, pre-programmed, dedicated, automatic electronic calculator system or method for assisting the user in making purchasing and/or consumption decisions while selecting a food product when in the supermarket or the like. Furthermore, none have related to calculating or providing the critical information required for revealing the undisclosed important percentage of fat calories per serving contained in the particular food item under consideration. Also, none even remotely suggest applicant's second program which enables this calculator system and method to calculate and display one's daily intake of total calories for determining fat grams and saturated fat grams intake allowance with a single input of actual or desired (ideal) body weight. Lastly, none even hints at applicants' dual purpose calculator system in which first and second programs are used to do both of the above.

In spite of all the substantial efforts of the prior art, the weight of the American people keeps steadily increasing to dangerous and near catastrophic levels. Furthermore, most medical experts today now recognize the direct medical link between a high fat consumption diet and life-threatening health risks, health hazards, diseases and illnesses such as heart disease, stroke, cancer, diabetes, hardening of the arteries, high cholesterol problems, high blood pressure, gall bladder, obesity, and those other illnesses and diseases which are associated with high fat consumption.

More recently, many leading medical experts and specialists in the field, mainly doctors and organizations such as the Surgeon General of the United States, the American Medical Association, the American Heart Association, the American Cancer Institute and the American Diabetes Institute have all strongly recommended that everyone should absolutely avoid eating any more than a maximum of thirty percent fat calories per serving, and, preferably, far less.

It is now well recognized that along with continued, ever-increasing obesity, high fat consumption can be directly medically linked to many life threatening diseases and illness. Therefore, probably the one greatest national health hazard plaguing America today is high fat food consumption. A gram of fat food has more than double the calories of a gram of non-fat food.

The present invention solves substantially many problems of the prior art in view of today's medical understanding of the importance of reducing or limiting the percentage of fat calories in food consumption, both to avoid life-threatening health hazards, diseases and illness now medically linked directly thereto, and also to prevent or reverse today's trend toward obesity without food deprivation, and adding any of the old problems of restrictive low calorie diets, crash diet programs, starvation diets and weight reacquisition.

SUMMARY OF THE INVENTION

It is an object of this invention to provide a pre-programmed, dedicated calculator system and method for providing dietary information relating generally to fat consumption.

It is another object of this invention to provide a pre-programmed calculator system and method for assisting a user in making food purchasing decisions.

It is a further object of this invention to provide a pre-programmed calculator system and method for aiding or assisting a user in making food consumption decisions.

It is another object of this invention to provide a pre-programmed calculator system and method for enabling a user to evaluate a given food item for the purpose of making a purchasing decision and/or consumption decision based on fat content.

It is yet another object of this invention to provide a pre-programmed calculator system and method for providing the user with the percentage of fat calories per serving contained in a given food item or food product under evaluation.

It is still a further object of this invention to provide a pre-programmed calculator system and method for signaling an alarm or alert state whenever the percentage of fat calories per serving is greater than a predetermined established value.

It is yet a further object of this invention to provide a pre-programmed calculator system and method for signaling an alarm or alert state whenever the percentage of fat calories per serving is greater than thirty percent.

It is an object of the present invention to provide a relatively small, compact, portable, simple, easy-to-carry, easy-to-understand calculator for use either where food items are purchased or at home for calculating and displaying the percentage of fat calories per serving in each given food item under consideration or evaluation for either purchasing or consumption purposes.

It is another object of the present invention to provide a percentage of fat calories calculator which is fast and easy to use even in a crowded grocery store, or the like.

It is another object of this invention to provide a percentage of fat calories calculator designed for use wherever labeled food items are sold.

It is yet another object of this invention to provide a percentage of fat calories calculator for enabling a user to quickly and easily make intelligent food purchasing decisions while in the very places where food items are sold.

It is a further object of the present invention to provide a dietary calculator which is used to check obesity and which meets today's dual need to prevent or eliminate obesity and to avoid life-threatening health risks or hazards directly medically linked to high fat consumption.

It is still a further object of this invention to provide a dedicated percentage of fat calories calculator which checks obesity and which signals or warns the user whenever the percentage of fat calories in a given food item under evaluation is more than a predetermined established percentage value which is considered dangerous, either from a weight control standpoint or as a health risk problem.

It is also another object of this invention to provide a helpful weight loss dietary calculator whereby dieters can constantly monitor their fat intake in accordance with every pound or pounds lost, thereby easily maintaining a healthful percentage ratio between total daily fat intake and total daily calorie consumption by steadily adjusting fat intake as the given weight progressively decreases.

It is yet a further object of this invention to provide a hand-held, dedicated calculator for automatically, quickly and easily computing the daily intake allowance of calories, fat grams, and saturated fat grams by simply entering a given body weight for enabling a user to maintain his or her present actual body weight or to lose undesired weight.

It is an object of the present invention to provide a pre-programmed, dedicated calculator system and method for automatically transferring the displayed, user-entered data into a memory after a first predetermined time delay.

It is another object of this invention to provide a pre-programmed, dedicated calculator system and method for generating a visual warning signal and/or an audio signal whenever the percentage of fat calories per serving in the food item under evaluation is greater than a predetermined value.

It is still another object of this invention to provide a pre-programmed, dedicated calculator system having a keypad or keyboard with a minimum number of keys.

It is yet another object of this invention to provide a pre-programmed, dedicated calculator system which may include a visual warning light and/or audio signal generator.

It is a further object of the present invention to provide a pre-programmed, dedicated calculator system which includes a key for transferring the user-entered data to memory after it has been displayed and verified by the user.

It is still a further object of this invention to provide a pre-programmed, dedicated calculator system wherein the keypad includes no more than twelve keys.

It is yet a further object of this invention to provide a pre-programmed, dedicated calculator system and method for enabling a user to maintain present actual body weight or to reduce actual body weight by a predetermined number of pounds.

It is another object of the present invention to provide a pre-programmed, dedicated calculator system and method wherein an input of ones current body weight produces dietary information on the daily intake allowance of calories, to determine maximum fat grams and saturated fat grams for healthfully maintaining current body weight.

It is still another object of this invention to provide a pre-programmed, dedicated calculator system and method wherein an input of ones ideal or desired body weight produces dietary information on the total daily allowance of calories, fat grams, and saturated fat grams needed to healthfully reach and maintain the entered ideal or desired body weight.

It is yet another object of this invention to provide a pre-programmed, dedicated calculator system and method for determining the percentage of fat calories per serving in a given food item under evaluation using one input of the number of fat grams per serving contained in the food item under evaluation and a second input of the total calories per serving contained in the given food item, as found on the food item itself, its package or a label affixed thereto.

It is a further object of this invention to provide a calculator system and method which calculates and displays the percentage of fat calories per serving in a given food item under evaluation from an input of the number of fat calories per serving and the total calories per serving contained in the food item under evaluation.

It is still a further object of this invention to provide a calculator system and method wherein the user can select between the percentage of fat calories program and the daily calories and fat grams intake allowance program.

It is yet a further object of this invention to provide a calculator system which is pre-programmed with both a first food shopping program for solving for the percentage of fat calories and a second home test program for solving for the daily intake of calories, fat grams and saturated fat grams and means for enabling the user to select between the two programs.

It is an object of this invention to provide a pre-programmed calculator system and method for helping a user to avoid life threatening health hazards associated with high fat consumption.

It is another object of this invention to provide a pre-programmed calculator system and method for helping the user to prevent undesired fat weight gain or to reduce by limiting his or her percentage of fat calorie intake.

It is still another object of this invention to provide a calculator system and method for helping the user to reduce ones present body weight by providing him or her with dietary information as to ones daily intake of calories, fat grams, and saturated fat grams needed to healthfully maintain that weight.

It is a further object of the present invention to provide a calculator system and method which can be used to evaluate the calculated percentage of fat calories per serving while the user is actually in the market place or wherever labeled food items are sold.

In the preferred embodiment of the present invention, a pre-programmed, dedicated calculator system and method therefor are provided for assisting a consumer, shopper or user to make purchasing and/or consumption decisions on various food items or products to avoid certain dietary fat related, life-threatening health risks and/or in order to maintain actual body weight or to lose undesired weight. All food items under evaluation, investigation or consideration have dietary information printed thereon or on the associated packages or labels, which may or does include such things as the number of fat grams, fat calories, and the total calories per serving contained in the given food item under evaluation. Fat grams per serving and total calories per serving are entered into the present calculator, and a first stored food shopping program then calculates the percentage of fat calories per serving in that particular food item. In an alternate embodiment, fat calories and total calories are entered and the percentage of fat calories is computed.

In another embodiment of the present invention, a different or second home test program asks the user to enter either his or her actual body weight or his or her desired body weight, and then calculates the daily intake allowance of total calories, fat grams and saturated fat grams needed for low fat intake control and for healthfully maintaining the entered weight. Lastly, a single dual purpose calculator can be provided with two programs, one (a food shopping program) for calculating the percentage of fat calories, and one (a home test program) for calculating the desired or ideal daily intake allowance of calories, fat calories and saturated fat grams. Regarding fat calorie intake allowance in accordance with body weight or total daily calories for that given weight, one can also beneficially monitor and adjust fat intake constantly as weight gradually decreases during an ongoing weight loss program, and thus, one may replace harmful high fat calories with even more non-fat calories, and nutritionally lose weight faster without food deprivation.

The present invention contemplates a relatively small, compact, portable, hand-held, pre-programmed, dedicated automatic calculator that is durable, easy to use and relatively low cost. The present calculator includes a memory for storing user-entered data, user prompts, and a program. A keypad or keyboard having a very limited number of keys is used to enter numerical data; and a display panel visually shows user-entered data, user prompts and final results. A master command and control system executes the programs, performs automatic calculations, and generates control signals. A first program takes user-entered data indicative of the number of fat grams per serving and the total number of calories per serving and calculates, as a final result, the percentage of fat calories per serving in the given food item under evaluation. If today's labels are changed to include the fat calories per serving, along with the number of fat grams per serving, as has been suggested, a modified program takes as its inputs the number of fat calories per serving and the total calories per serving and then computes the same final result in terms of the percentage of fat calories per serving.

Furthermore, the final result can be compared with a predetermined established value, such as thirty percent, and an alarm or alert message can be displayed on the display panel whenever the percentage of fat calories is greater than the predetermined value. Either a visual alarm signal or an audio alarm signal or an intermittent blinking of the display panel or any combination thereof can also be used to alert the user to the high fat content of the current food item under evaluation.

A second program enables the user to use the same calculator, if desired, to calculate the daily intake of total calories which determines total fat grams and saturated fat grams using only the actual or desired body weight of a person as an input. The same calculator can operate both programs and allow the user to select either one.

The present invention can operate after a first predetermined time delay to transfer user-entered data from the display panel to a memory; or it can use an additional entry key on the keypad for that purpose. With the time delay, the keypad may include only eleven keys, including ten numerical data entry days representing the numerals 0–9 and a single on/off/clear key. Similarly, the system can be selectively turned on by an on/off switch or it can automatically shut down if no information is entered for a second predetermined period of time.

These and other objects and advantages of the present invention will be more fully understood after reading the Specification, the Claims and the Drawings, which are briefly described hereinbelow.

DETAILED DESCRIPTION

Figure 1:
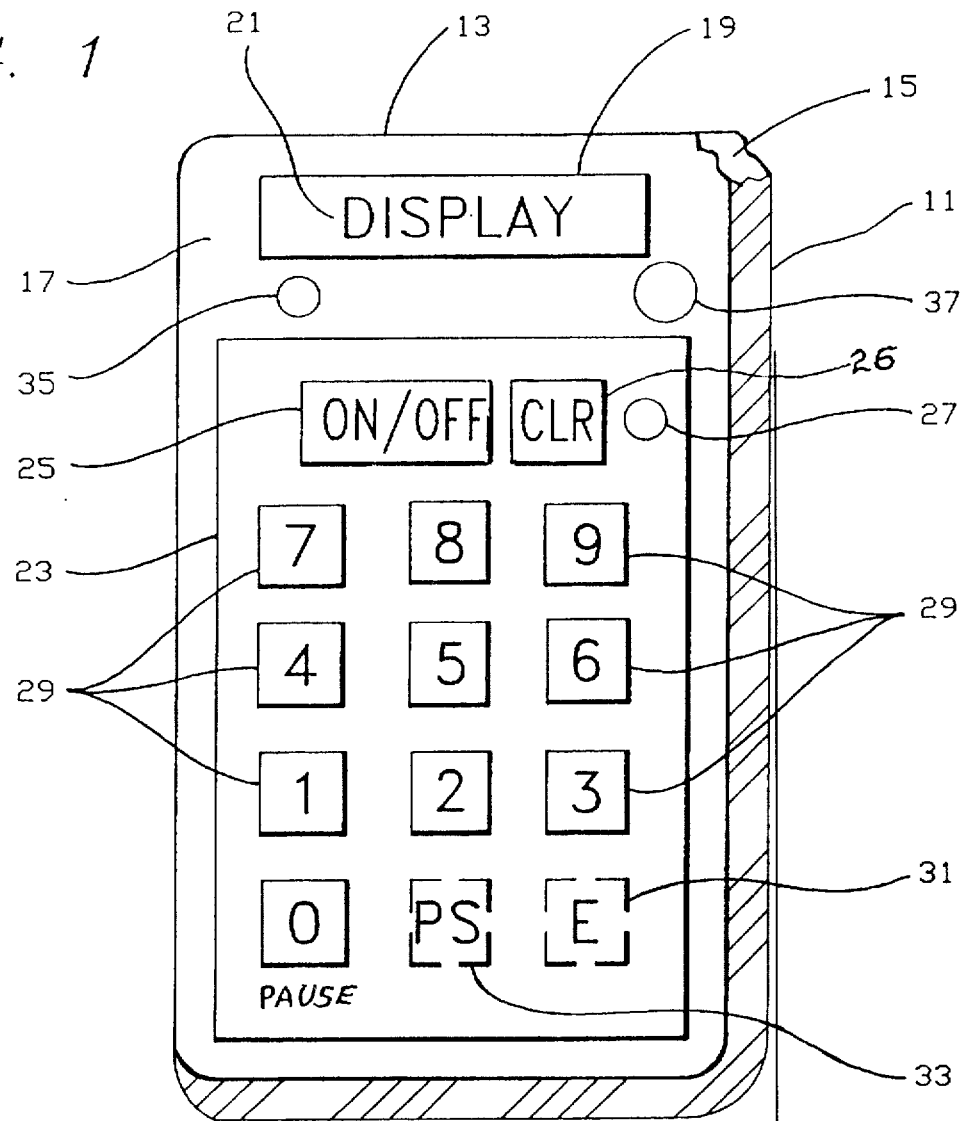
FIG. 1 is a perspective view of the calculator of the preferred embodiment of the present invention.

FIG. 1 shows a perspective view, partially broken away, of the relatively small, compact, portable, hand-held, easy-to-use, pre-programmable, dedicated calculator or calculator system 11 of the present invention. The calculator 11 includes a generally rectangular housing 13 having substantially hollow interior 15 and a front surface 17. The upper end portion of the front surface 17 of the calculator 11 includes a display panel 19 for visually displaying or showing information or data 21. Furthermore, the front surface 17 of the calculator 11 includes a keypad or a keyboard section 23 which includes an on/off key 25, a clear key 26, and an optional power on indicator light 27. Furthermore, the keypad 23 includes a set of ten data entry keys 29 representing the numerals 0–9. The numeral "0" also may be used for a "pause" function, described later. An optional entry key "E" is designated by reference numeral 31; and an optional program select key is designated by reference numeral 33. Finally, the front surface 17 of the calculator 11 of the present invention may also include either one or both or neither a visual warning light or LED 35 and an audio signal output 37. The audio output 37 can be used to generate any type of audio alarm or alert signal for warning the user that the particular value of percentage of fat calories shown on the display panel 19 is greater than some predetermined established amount which represent danger, for example thirty percent. Similarly the LED or warning light indicator 35 can be used for the same purpose and can be either turned on to indicate an alarm condition or it can be flashed intermittently on and off to signal the alarm or alert state. Finally, the display panel 19 may be flashed or blinked intermittently on and off to indicate the alarm state or condition.

The calculator 11 of FIG. 1 also can be configured so as to eliminate the need for the enter key 31. The actuation of the entry key 31 causes the user-entered data currently displayed on the display panel 19 to be transferred to the memory for storage, as hereinafter described. However, a conventional time delay can also be used; so that after some predetermined time delay which is sufficient to give the user enough time to read and verify the information or data displayed on the display panel 19, the user-entered data can be automatically transferred to memory and stored for future use. Likewise, the power "on" indicator light 27 is also an option and need not be included in the preferred embodiment of the present invention; although it is convenient, since it alerts the user to the fact that power is currently on for the calculator 11. The keypad 23 of the present calculator 11 is extremely simple, easy-to-use, and easy to understand, since the keys contained thereon are minimized. The operator or user does not need to worry about anything except the data entry keys since the pre-programmed calculator itself takes care of the mathematical functions of addition, subtraction, multiplication and division, contrary to most hand-held calculators where the user is responsible for those functions. In the preferred embodiment, the keypad 23 contains only eleven keys, including a set of ten data entry keys 29 and one on/off key 25. However, in alternative embodiments, the number of keys may be increased to twelve to include the Enter key 31 or even to as many as thirteen, if a program select switch is used. It will also be understood, however, that the computer 11 of the present invention can be wired so that when it is turned on, it automatically goes to the first (food shopping) program and if the on/off button 25 is pressed or actuated before any data is entered into the system, the system will automatically go to the program number two (home test) mode of operation, without the need of using the program select key 33.

Similarly, the preferred embodiment of the present invention also eliminates the need for the LED 35 and the audio indicator 37, sine, in the preferred embodiment, whenever an alert or an alarm condition exists, an alarm message is carried by the display panel 19; and the display panel 19 can be intermittently flashed or blinked on and off to alert the user to the existence of the alert or alarm condition.

Figure 2:
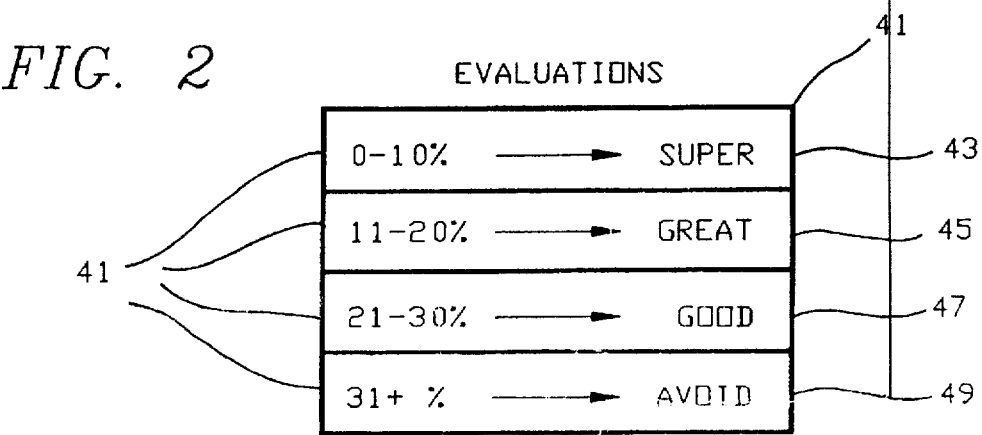
FIG. 2 is a table of evaluation results usable with the calculator of FIG. 1.

FIG. 2 shows the various evaluations 41 of the results generated and displayed by the calculator 11 operating in the first (food shopping) program mode. The evaluations of FIG. 2 shown in the box 41 represent the final result or answer in terms of the percentage of fat calories per serving contained or found in a given food item or product under consideration or evaluation. In the first block 43, the chart 41 indicates that values in the range of 0% to 10% represent a super condition and the food item is worth buying and consuming. Block 45 shows that for values in the range of 11% to 20% the food item is rated great and can also be safely purchased and consumed. Block 47 indicates the range 21% to 30%, which is rated good. Finally, the block 49 shows that for values 31% and over, the food item or product should be avoided for healthy low fat purchasing and consumption; and the word or alarm message "ALERT", "AVOID", or "ALARM" appears on the display panel 19.

Figure 3:
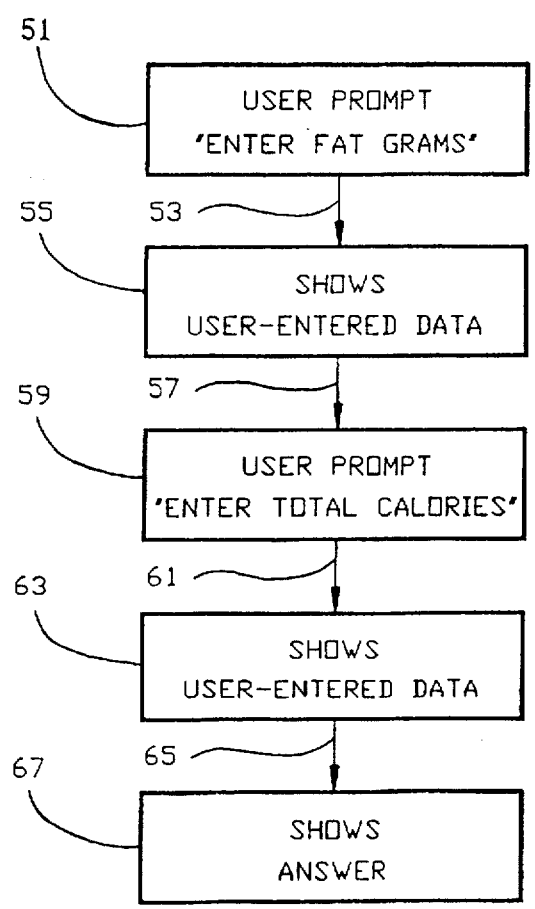
FIG. 3 is a block diagram showing the user prompts, final result, and alarm message used in the first program of the calculator of FIG. 1.

FIG. 3 shows a generalized block diagram in sequential order showing some of the various messages appearing on the display panel or screen 19 of the calculator 11 of FIG. 1 when it is operated in the food shopping mode. In Block 51, the user prompt "Enter Fat Grams" is shown. This initiates the process. The user then reads the number of fat grams contained in each serving of the given food item under consideration or evaluation and listed either on the food item itself or on its package or label. The display then proceeds via sequential path 53 to block 55, which shows the user-entered data which is entered on the data entry numerical keys 29 of the calculator 11 to enter the number of fat grams listed on the product label. This user-entered data is displayed and then left on the screen long enough for the user to verify the accuracy of the data and to make any changes necessary by using the clear key and re-entering the data. Sequence path 57 then proceeds to block 59 which shows that the display panel 19 shows a second user prompt "Enter Total Calories". Again, the user obtains this data from the food product, or its label or package and enters it via the numerical data entry keys 29 into the calculator 11. Sequential data path 61 then leads to block 63, which shows that the user-entered data is again displayed visually on the display panel 19 for user verification purposes. Once the data has been verified and transferred to memory, we proceed via sequential path 65 to block 67 where the calculator shows the final answer or solution to the calculations or computations involved in terms of the percentage of fat calories per serving contained in the particular food item or product under evaluation or consideration.

Figure 4:
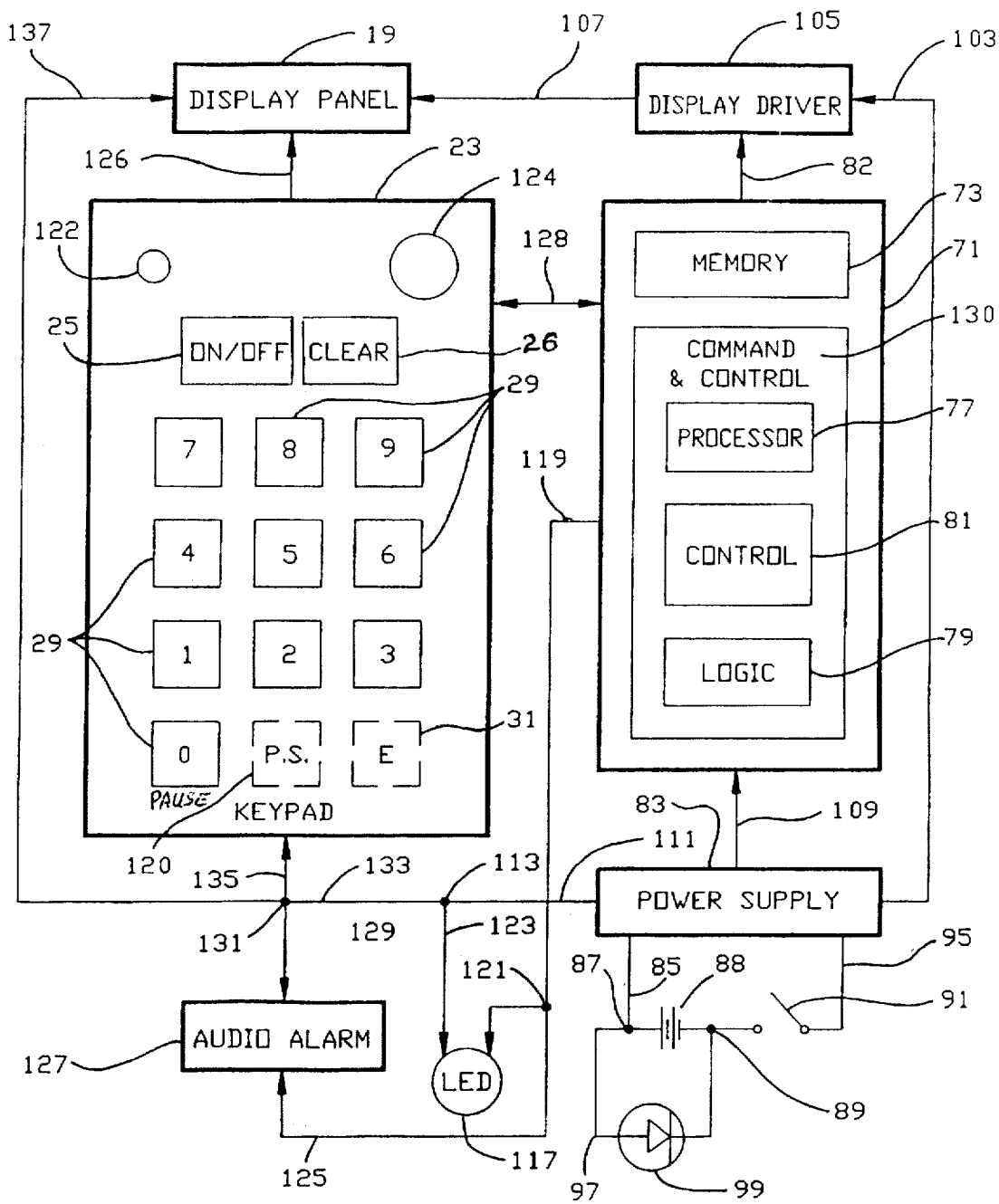
FIG. 4 is a functional block diagram of the calculator of FIG. 1.

FIG. 4 represents a functional block diagram of the calculator system 11 of FIG. 1. In FIG. 4, the display panel is illustrated as block 19 and the keypad is illustrated broadly by reference numeral 23. The keypad 23 is shown as having an on/off key 25, a clear key 26, and a plurality of 10 numerical data entry keys 29 representing the decimal digits or numerals 0 through 9. The keypad 23 is also shown as including an optional data entry key 31 and an optional program select key or switch 120. Furthermore, the keypad 23 of FIG. 4 is shown as including an LED or visual warning light 122, and an audio signal generator represented by reference numeral 124.

FIG. 4 also shows the calculator 11 includes a calculator interior portion 71, which includes a memory 73. In addition, the calculator interior portion 71 includes a master command and control system 130 which includes a processor means 77, an arithmetic and logic means 79, and a control means 81.

The hollow interior 15 of the calculator 11 also includes a power supply 83 and a display driver 105. The power supply 83 includes a lead 85 passing from the power supply 83 to a node 87. Node 87 is connected to the positive terminal of a battery 88 whose negative terminal is connected directly to an output node 89. Node 89 is connected directly to a normally open switch contact or terminal while a movable switch arm 81 is connected by a lead 95 back to the power supply 83. The switch arm 91 is operated by the on/off switch 25 of the keypad 23; and when the switch arm 91 is closed on the contact attached to node 89, the system is energized. Furthermore, the lead 97 is connected to node 87 and to the positive input of an LED indicator light 99 whose cathode is connected directly to node 89, as previously described. Furthermore, another output of the power supply 83 is connected via lead 103 to the input of the display driver 105, and the output of display driver 105 is connected to the input of the display panel 19 via lead 107. Another output from the power supply 83 is connected via lead 109 directly to an input to the internal or interior electronic portion 71 of the calculator 11, while a third output lead 111 connects the power supply 83 to an output node 113. Output node 113 is connected to one input of a light emitting diode 117 via lead 123 and to a node 131 through a lead 133. Node 131 is connected directly to the power supply input of the keypad 23 via lead 135 and to an audio alarm 127 via lead 129. Node 131 is also connected via lead 137 to the power supply input of the display panel 19.

Data from the keypad 23 is supplied via data path 126 to one input of the display panel 19 while a two way data path 128 connects the keypad portion 23 with the internal system 71 of the calculator 11. Lead 82 provides an output from the internal system 71; and it is connected to the input of the display driver 105 for controlling the operation of the display panel 119, as known in the art. Another control output of the internal electronics system 71 is taken on lead 119 and supplied directly to an output node 121. Node 121 is connected directly to the second input of the LED 117 and via lead 125 to the second input of the audio alarm system 127. Initially, the memory 73 of the internal system 71 of the calculator 11 is provided with one or two programmable memories, for example ROMs and/or PROMs, which are pre-programmed or "burned in" at the factory. These programs become a permanent part of the memory 73, as known in the art. Furthermore, a first user prompt which tells the user to enter the number of fat grams per serving contained in the particular food item under investigation is permanently stored, along with a second user prompt which advises the user to enter the total number of calories per serving contained in the food item under evaluation. Either the memory or the program also stores certain mathematical constants, such as the number 9 and the number 100% (and others described subsequently). The memory 73 also stores an error or alert message which is used to advise the user of the fact that the answer in terms of the percentage of fat calories per serving contained in the food item under evaluation is greater than some predetermined established value or limit, for example 30%.

In operation, the user actuates the on switch 25, which closes the switch arm 91 to provide power to the system as well as illuminating the light emitting diode 99 as a power on indicator. The stored program then calls for the first user prompt to be displayed on the display panel 19; and the display panel then visually shows the message "Enter Fat Grams" (block 51 of FIG. 3) advising the user to enter the number of fat grams per serving contained in the particular food item under evaluation as listed on the label, package or food item itself. The user then actuates the appropriate numerical data entry keys 29 of the keypad 23 and enters or inputs the value of the number of fat grams per serving contained in the particular food item under evaluation. This value is then immediately displayed on the display panel 19 for user verification purposes (block 55 of FIG. 3). If the user-entered data displayed is in error, the user can press the clear button 26 to actuate the clear function, causing the display panel 19 to go blank and allowing the user to re-enter the correct data on the keys 29 of keypad 23. Once the user has verified the data shown on the display panel 19, he either depresses the Enter key 31 or, after a predetermined time delay, the data will be transferred to memory 73 and the display panel 19 will again go blank.

The command and control portion 130 will then execute the program contained in the memory 73 and multiply the number of fat grams entered by the user by 9 to obtain first intermediate or temporary result. This result is stored in the memory 73 without being displayed on the display panel 19, since it has relatively no meaning to the user. Next, the command and control system 130 and the program stored in the memory 73 will call up or retrieve the second user prompt (block 59 of FIG. 3) and cause it to be visually displayed on the display panel 19. This display tells the user to enter the number of total calories per serving found in the particular good item under evaluation.

Once the user enters this value on the keys 29 of the keypad 23, the data will again appear on the display panel 19 (block 63 of FIG. 3) for user verification. Once verified, the data will be transferred to the memory 73 and stored therein; and the screen or display 19 will again go blank. Command and control means 130 will then divide the first intermediate result by the newly entered data to achieve a second temporary or intermediate result. The second intermediate result will then be multiplied by 100% to provide the answer or final result (block 67 of FIG. 3) in terms of the percentage of fat calories per serving contained in the particular food item under evaluation. This information then is displayed on the display panel 19 for user information. The user can use this information for making a purchasing and/or consumption decision.

In the event that the final answer or result calculated by the command and control means 130 is greater than a predetermined established value or limit, such as 30%, an error message is called up from memory 73 and is transferred to the display panel 19 for advising the user to avoid that particular food item. Furthermore, the display panel 19 can have its lights blinked on and off intermittently to signal this alert or alarm condition to the user to insure that it is noted by him.

The system then recycles back after another predetermined time delay, and the first user prompt again is retrieved from memory 73 and transferred to the display panel 19 for user information. At this point, the cycle begins anew and continues, so long as there are other food items or food products to be evaluated. Once all of the products to be evaluated have been considered and processed, the user can either turn the system off manually by depressing the on/off key 25 or the system can be configured so that after a predetermined time delay, the system automatically shuts off if no new data is entered by the user.

Figure 5A:
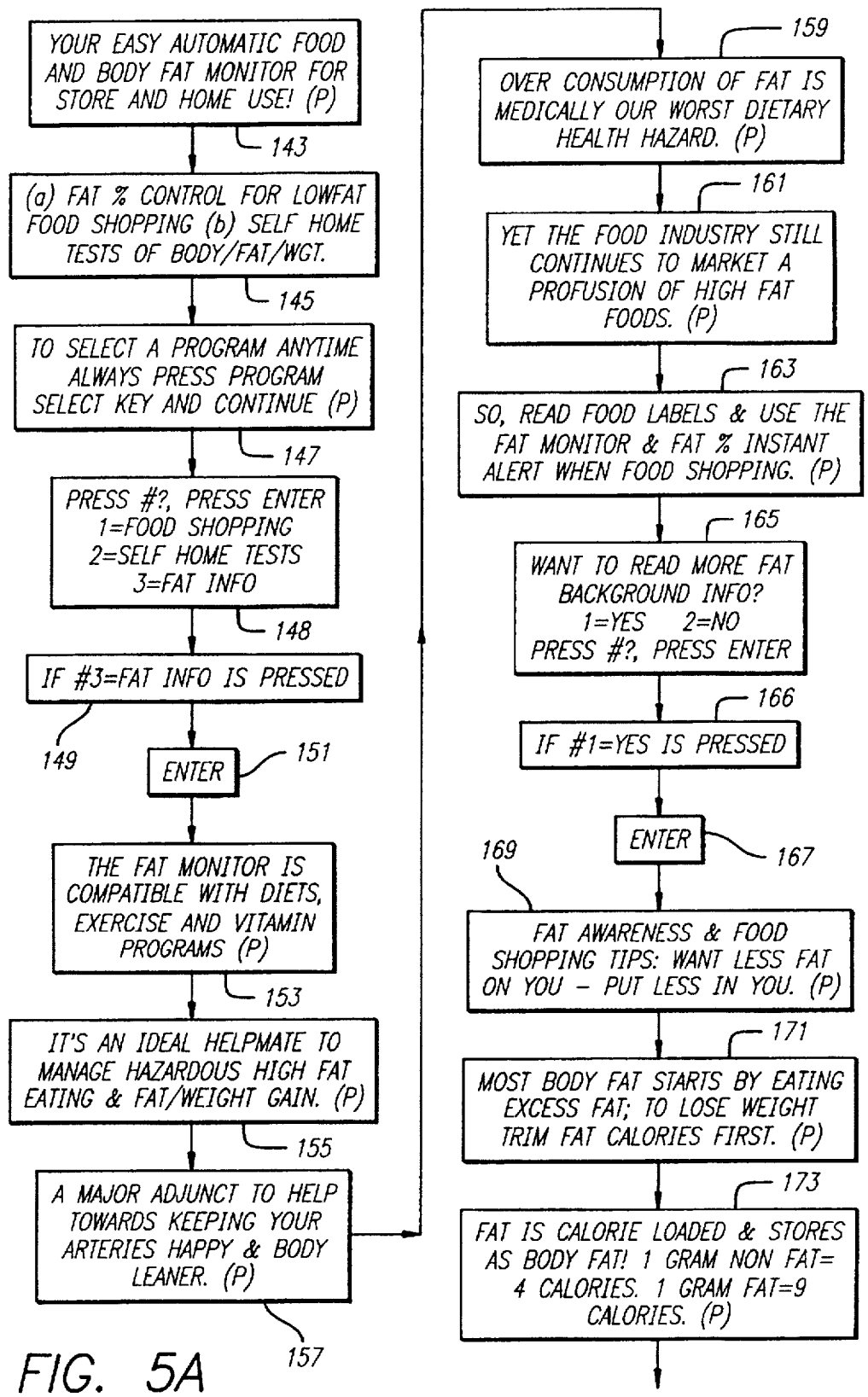
FIG. 5 is a flow diagram of background information displayed by the calculator of FIG. 1.
Figure 5B:
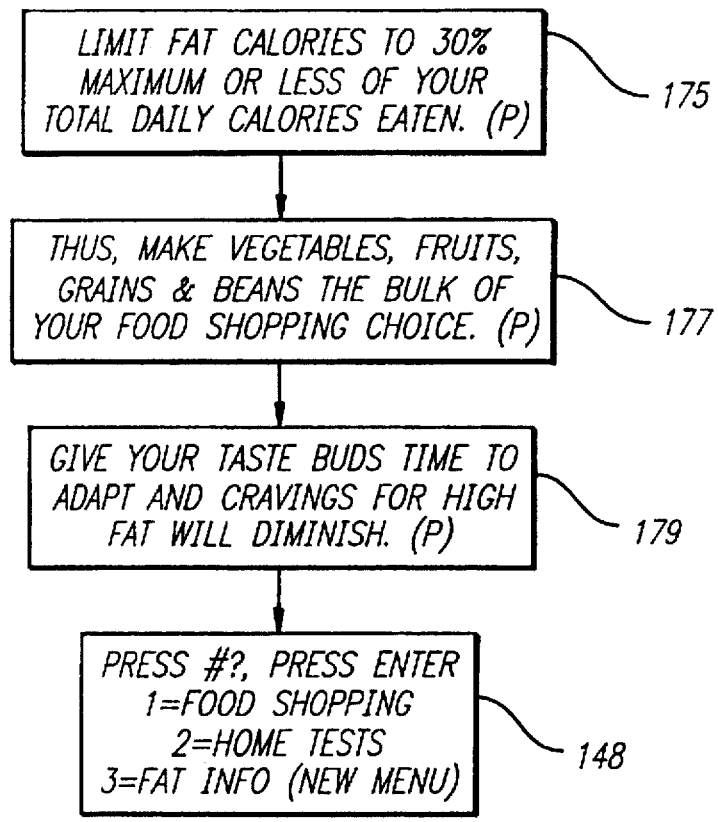

FIG. 5 is a flow diagram of various displays and prompts, along with the executions which are made by the user of the calculator system 11 to operate either the food shopping program or the home test program, as well as providing a display of stored information. When the system is to be used, the user first must depress the on/off button 25 of the keypad 23 to provide electrical power to the calculator system 11. In FIG. 5, this is shown in block 141. When the calculator 11 is turned on, the display panel 19 then sequentially displays the information shown in blocks 143, 145 and 147. These display screens, and others which are shown in FIG. 5, advance automatically until a screen is displayed requiring a decision by the user. Whenever such a decision screen is reached, the action requested by the screen must be entered by the user in order to cause the system to enter into the selected mode of operation. As is readily apparent from screens 143 through 147 shown in FIG. 5, the information provided essentially is background information, including screen 147. This screen, however, notifies the user that the automatic information display which takes place from screen to screen, as illustrated in FIG. 5, can be interrupted at any time by depressing the Program Select key 33 on the keypad 23. Whenever the key 33 is depressed, as indicated by the designation (P) on the different screens illustrated in FIG. 5, the system automatically displays the menu shown in screen 148 on the display 19. Thus, if at any time the sequential display of information is not desired by a user, depression of the Program Select key 33 causes the menu of screen 148 to be displayed.

The system is pre-programmed to cause the "fat information" or background information to be sequentially displayed to the screen 148. When the display of screen 148 appears on the display panel 19, it prompts the user to depress one of the keys 29 corresponding to the numbers 1, 2 or 3, as indicated by the display prompt. For the purposes of this illustration, FIG. 5 indicates the selection at 149 of the key for "Number 3", which designates a request for further displays of the fat information. After this key is pressed, it is displayed on the display 19 and depression of the Enter key 31 at 151 then causes the selection to be supplied to the calculator system 11.

In FIG. 5, the fat information screens 153, 155, 157, 159, 161, 163 and 165 then are sequentially displayed in the display panel 19 at a rate which is pre-programmed by the timing circuit within the calculator system 11. Consequently, a user of the system is provided with useful information concerning background information and general information for utilization of the programs in the calculator system 11. When the screen at 165 is reached, the prompt "Want to Read More Fat Background Info?" is presented. As shown in FIG. 5, the option is presented to the user of depressing the "1" key on the keypad 23 for a "yes" answer or depressing the "2" key on the keypad 23 for a "no" answer. Whichever key is depressed at this prompt, the display then shows the selection entered. The user then depresses the Enter key 31 to step the calculator system 11 to the selected answer. If a "yes" (Key 1 on the keypad 23) is depressed, the information is entered at 167 at the additional screens 169, 171, 173, 175, 177 and 179 are sequentially displayed from the memory 73 in the calculator system 11 at a predetermined rate sufficient to permit the user to read and comprehend the information displayed. Once again, it should be noted that at any time the user desires to select one of the operating programs of the system, the Program Select key 33 may be depressed, as indicated by the designation "(P)" in each of the screen displays shown in FIG. 1. Whenever this is done, the following screen displays are skipped; and the system is placed in the program entry mode designated by the screen 148 described previously.

When the information on screen 165 is presented, if the user selects the "no" answer (by depressing key "2" on the keypad 23), depression of the Enter key 31 at 168 immediately steps the system back to the Program Select menu 148, as indicated in FIG. 5. If, however, all of the additional fat background information screens 169 through 179 are presented, the program automatically steps to the Program Select screen 148 upon termination of the screen 179, as indicated in FIG. 5. At this point the user has the option to repeat the "fat information" material by depressing key 3 on the keypad 23; or the user may select one or the other of the two programs by depressing either key "1" or key "2" on the keypad 23 to select the "food shopping" program or the "home test" programs, respectively.

Figure 6A:
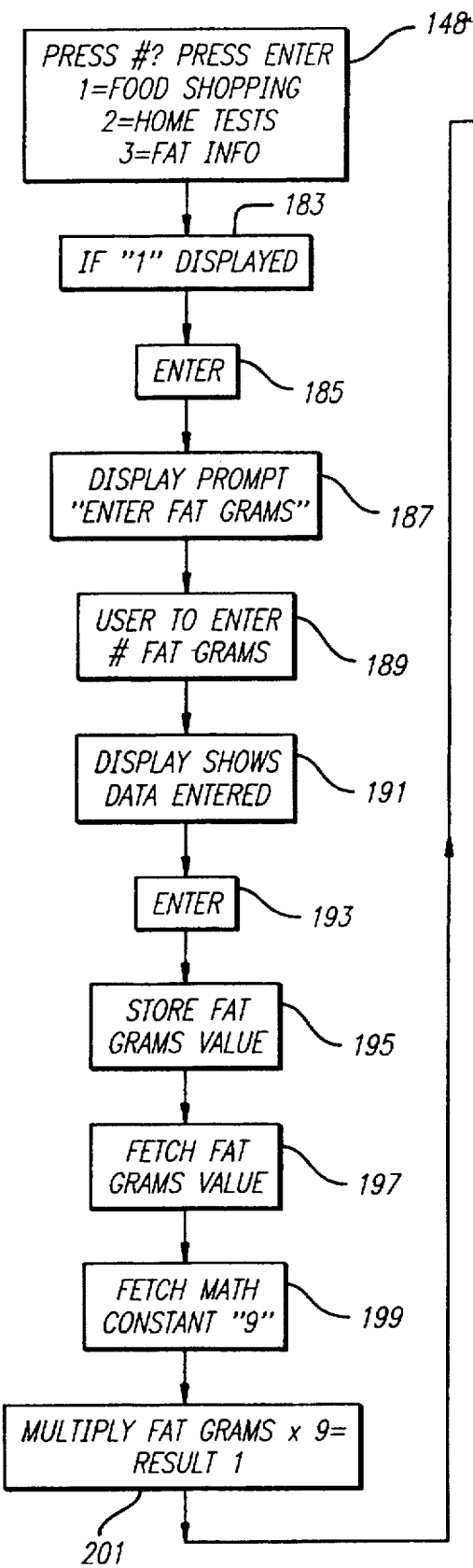
FIGS. 6A and 6B (taken together) are a flow diagram of the first program of the present invention.
Figure 6A:
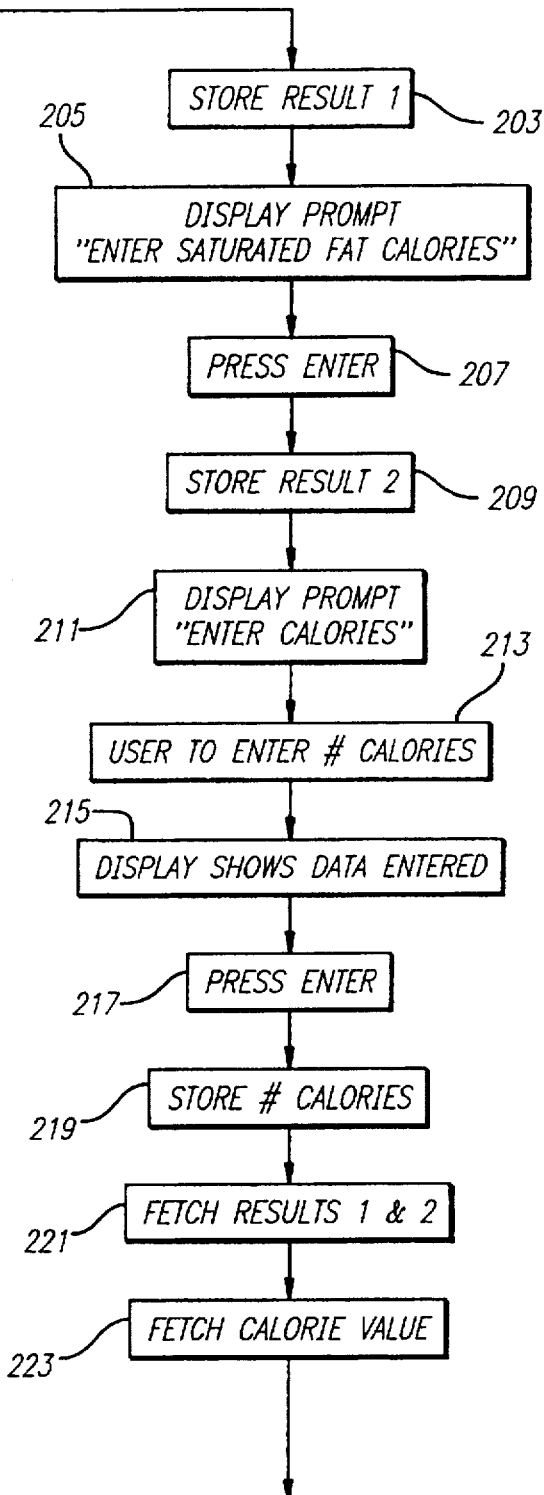
Figure 6B:
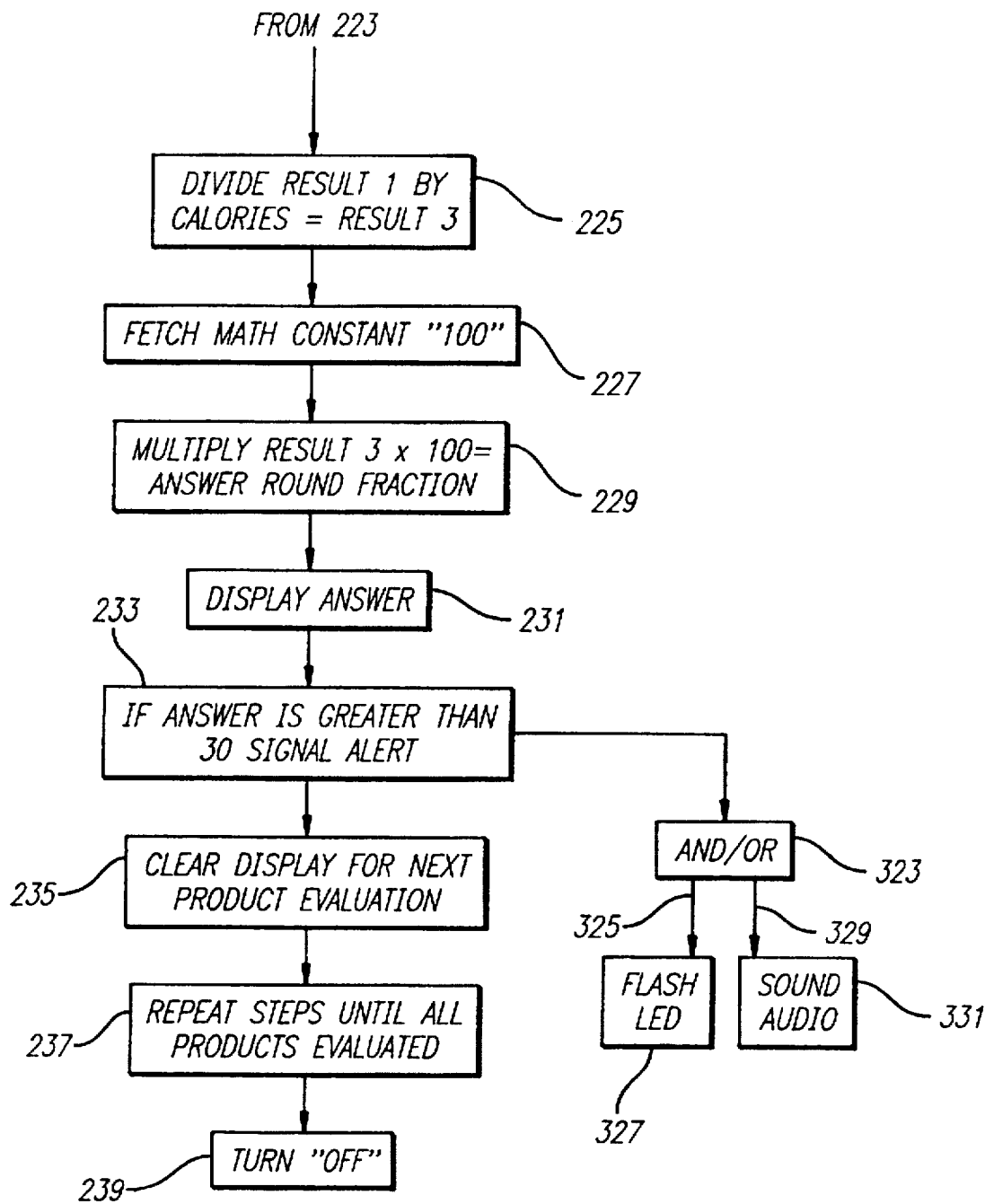

Reference now should be made to FIGS. 6A and 6B, which together are a flow chart of the first or food shopping program, which may selected at the prompt 148 in either of the positions shown in FIG. 5. At the display of the prompt 148, if the user then selects "1" from the keypad 23, the selection is displayed at 183. The "1" is displayed on the display panel 19 to show the data entered by the user by way of the selected "1" data entry key 29 of the keypad 23 of the calculator 11. The data is displayed at 183 either for a predetermined amount of time until it is automatically transferred to memory in the calculator system of FIG. 4, or, the Enter key 31 on the keypad 23 is depressed at 185. This completes selection of the food shopping program (Program 1) and the remainder of the sequence shown in FIG. 6 is effected by the operation of the calculator system for that program.

The next prompt is at 187 and prompts the user to enter the number of fat grams per serving contained in the particular food item under investigation or evaluation. This information is typically listed on the label, package or food item itself being evaluated; and the user simply enters that information by means of the numerical data entry keys 29 of the keypad 23 at 189. The display panel 19 shows the data entered at 191. This data is displayed for either a predetermined amount of time, until it automatically is transferred to memory 73 (FIG. 4), or, the Enter key 31 is depressed to effect the transfer of the data to memory and storage in the calculator system shown in FIG. 4. This is shown by the "Press Enter" designation at 193 and the information is stored at 195, as indicated in FIG. 6.

Once the information is stored in the memory 73, the fat grams value is retrieved, fetched or called up by the command and control means 130 (FIG. 4) at 197 and the system then internally calls up or retrieves the mathematical constant 9 from the memory 73 (as indicated at 199 in FIG. 6). This step is effected automatically in the system; although the information could be entered manually if the constant was not included in the program itself. The internal program of the calculator system of FIG. 4 then (at 201) automatically multiplies the number of fat grams per serving times 9 to get a temporary or intermediate "result 1" (the number of fat calories) which then is transferred to and stored in the memory 73 by the system, as shown at 203 in FIG. 6.

After storage of "result 1" at 203, the system then displays the prompt "Enter Saturated Fat Calories" at 205. This is followed by a display on the display panel 19 of the number of fat calories entered by depressing selected ones of the numerical data entry keys 29 of the keypad 23. Following this, the Enter key 31 is depressed at 207 and the system stores this information in the memory 73 as "result 2" at 209. Following this operation, the next display on the display panel 19 is of the prompt "Enter Calories" at 211. The user enters the number of calories via the data entry keys 29, as shown at 213, and the display 19 shows the data entered at 215. As described previously, this information either automatically is transferred or is stored by depression of the Enter key 31 on the keypad 23. As shown at 219, the user entered data as to the total number of calories per serving is stored in the memory 73 for later use. It should be noted that at any time user entered data, as displayed on the panel 19 and as indicated, for example at box 191 or 215, is incorrect, the user may depress the Clear key 26 to clear the information. After this is done, new information then may be entered via the numerical data entry keys 29 and the operation described previously resumes.

After the calories per serving have been stored at 219, the system of FIG. 4, through the master command and control means 130, fetches or retrieves the intermediate results 1 and 2 at 221, and also retrieves or fetches the total calories value from the memory 73 at block 223. The command and control means 130 of the system shown in FIG. 4 is programmed to divide "RESULT 1" by the number of calories to get a third intermediate result "RESULT 3" (percentage of fat calories). At 227, the command and control means 130 causes a retrieval of the mathematical constant 100% from the memory 73. At 229, the command and control means 130 multiplies the "RESULT 3" by 100% to get the final "ANSWER". This answer is displayed on the display panel 19 at 231, along with the percentage of saturated fat calories (programmed by dividing saturated fat calories by total calories) for user edification. This display exists for a pre-established interval; and the system then proceeds to block 225 which indicates if ANSWER is greater than 30% and/or the saturated fat calorie evaluation is over 10%, or both; and an alarm signal is generated at 323 to either flash the LED at 327 or sound an audio alarm at 331. Following this step, the display is cleared at 235 and all of the steps, from 187 through 235, are repeated at 237 until all of the products in this particular shopping interval are evaluated. When no more entries are desired, the on/off switch 25 is depressed; and the system is turned off at 239.

Figure 7:
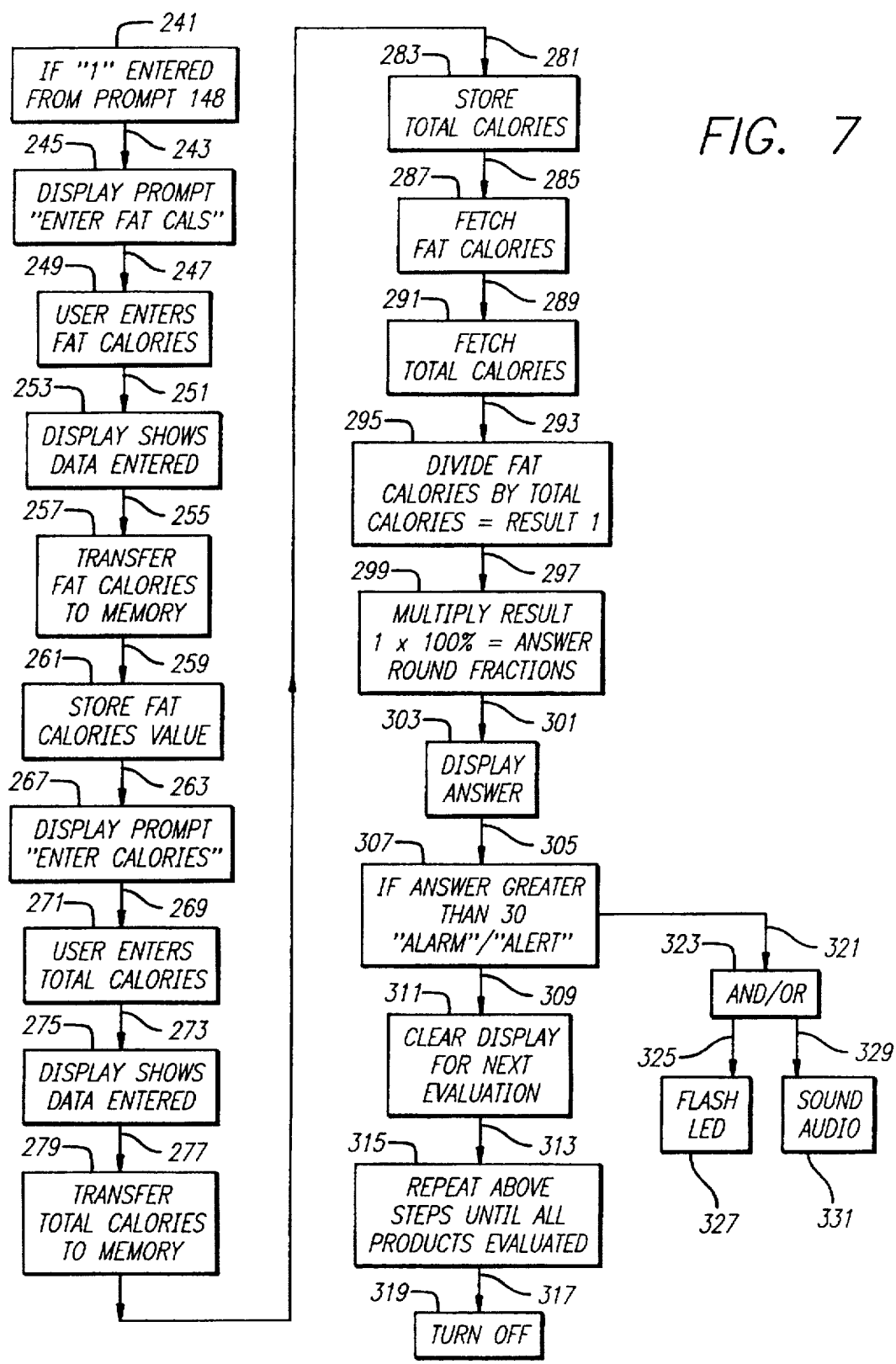
FIG. 7 is a flow diagram of a modified version of the first program of FIGS. 6A and 6B.

FIG. 7 shows a flow diagram of the modified first program of the present invention, which is adapted to be used with an input of the number of fat calories per serving, rather than with an input of the number of fat grams per serving. If Program "1" is selected at 240 and is entered by depressing the Enter key 31 at 241, Path 243 then connects to block 245, which shows that the display panel 19 shows the first user prompt "Enter Fat Calories". Path 247 then passes to block 249 which shows that the user, having read the first user prompt, selects the value of fat calories found on the food label, on the food package or on the food item itself, and enters it via the numerical data entry keys 29 of the keypad 23. Flow direction arrow 251 then goes to block 253, which indicates that the user-entered data indicative of the number of fat calories per serving in the product being evaluated is displayed on the display panel 19 for user verification. Arrow 255 then goes to block 257, which shows that the data entered or the number of fat calories per serving is then transferred to the memory 73 for storage therein. Path 259 then goes to block 261 and indicates that this value is stored in the memory 73 for later recall. Path 263 connects to block 267, which shows that the system displays the second user prompt "Enter Total Calories". Proceeding via flow path 269 to block 271, the user enters the total number of calories per serving contained in the food item under evaluation via the numerical data entry keys 29 of the keypad 23 of the calculator 11 of the present invention. Path 273 then goes to block 275, which indicates that the display panel 19 shows the data entered by the user. After verification, arrow 277 passes to block 279 and shows that the user-entered data is transferred to the memory 73. Path 281 goes to block 283 to signify that this user-entered data is then stored in the memory 73. Path 285 goes to block 287, which shows that the command and control system recalls or retrieves the value indicative of the number of fat calories per serving and then, via arrow 289 and block 291, it fetches or retrieves the total number of calories value, and then proceeds, via flow arrow 293, to block 295 wherein the command and control means 130 divides the total number of fat calories per serving by the total number of calories per serving to get a first intermediate result RESULT 1. Path 297 then goes to block 299, which shows that the intermediate RESULT 1 is multiplied by 100% to get the final ANSWER. All answers automatically are rounded off to the nearest whole number. The final answer is then transferred via flow arrow 301 to block 303 to show that is visually available on the display panel 19 for the user. Furthermore, the next flow arrow 305 connects block 307. Block 307 performs a comparison; and if ANSWER is greater than 30%, an alarm or alert condition is generated. Path 309 then passes to block 311 and shows that the display is cleared at this point for the next product evaluation. Arrow 313 then goes to block 315 and indicates that all of the above steps are repeated until all products to be evaluated have been processed. Finally, after all products to be evaluated have been processed, path 317 goes to block 319 and requires the user to turn the system off. An optional path is indicated by the flow arrow 321 from block 307 to block 323, which indicates an and/or condition. Block 323 is optionally connected by a flow arrow 325 to block 327, which indicates that an LED is flashed or turned on continuously of flashed intermittently on and off, and path 329 connects block 323 to block 331, which indicates that an audio signal is sounded or generated.

Figure 8A:
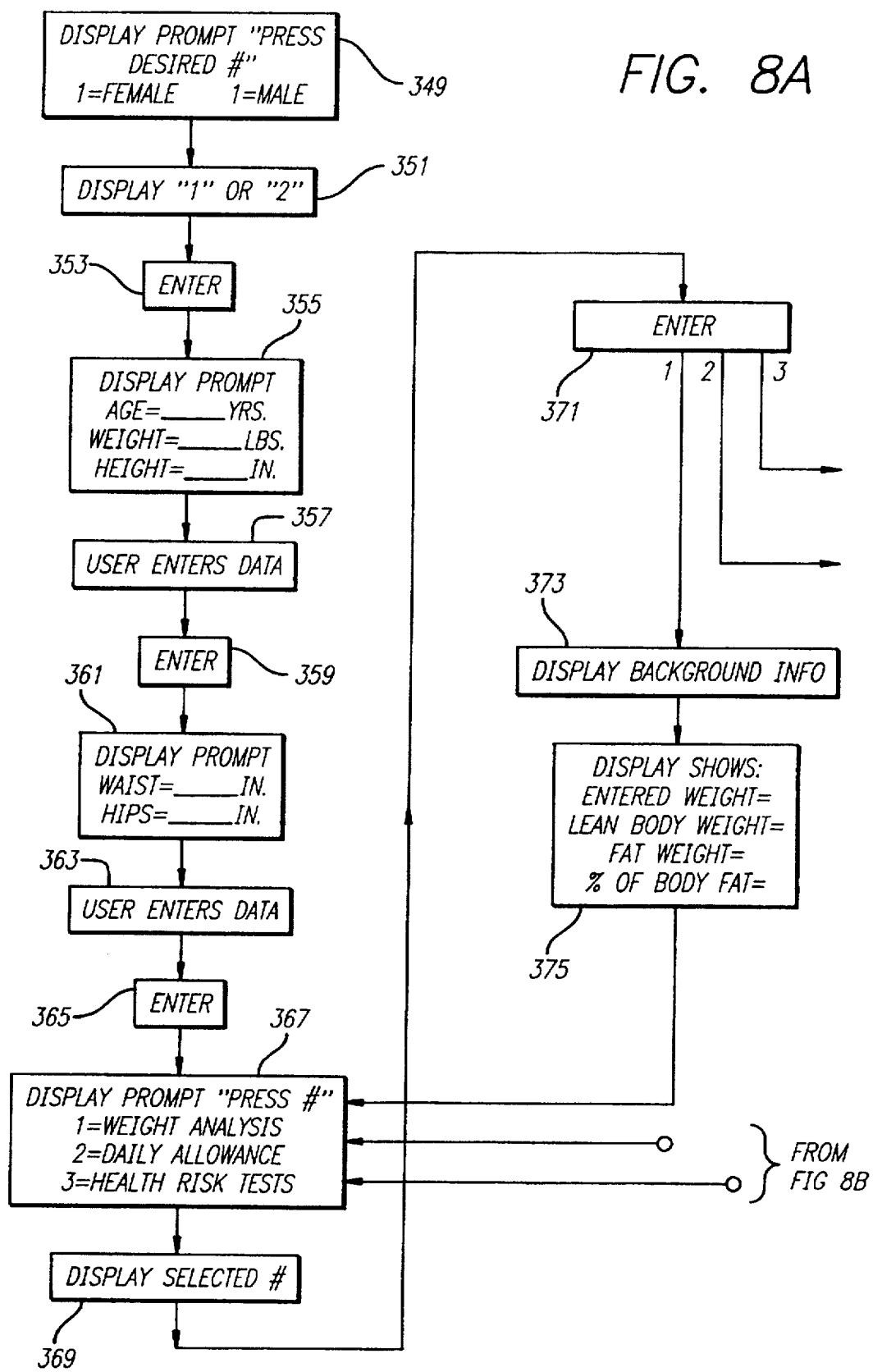
FIGS. 8A and 8B (taken together) are a flow diagram of the second program of the present invention.
Figure 8B:
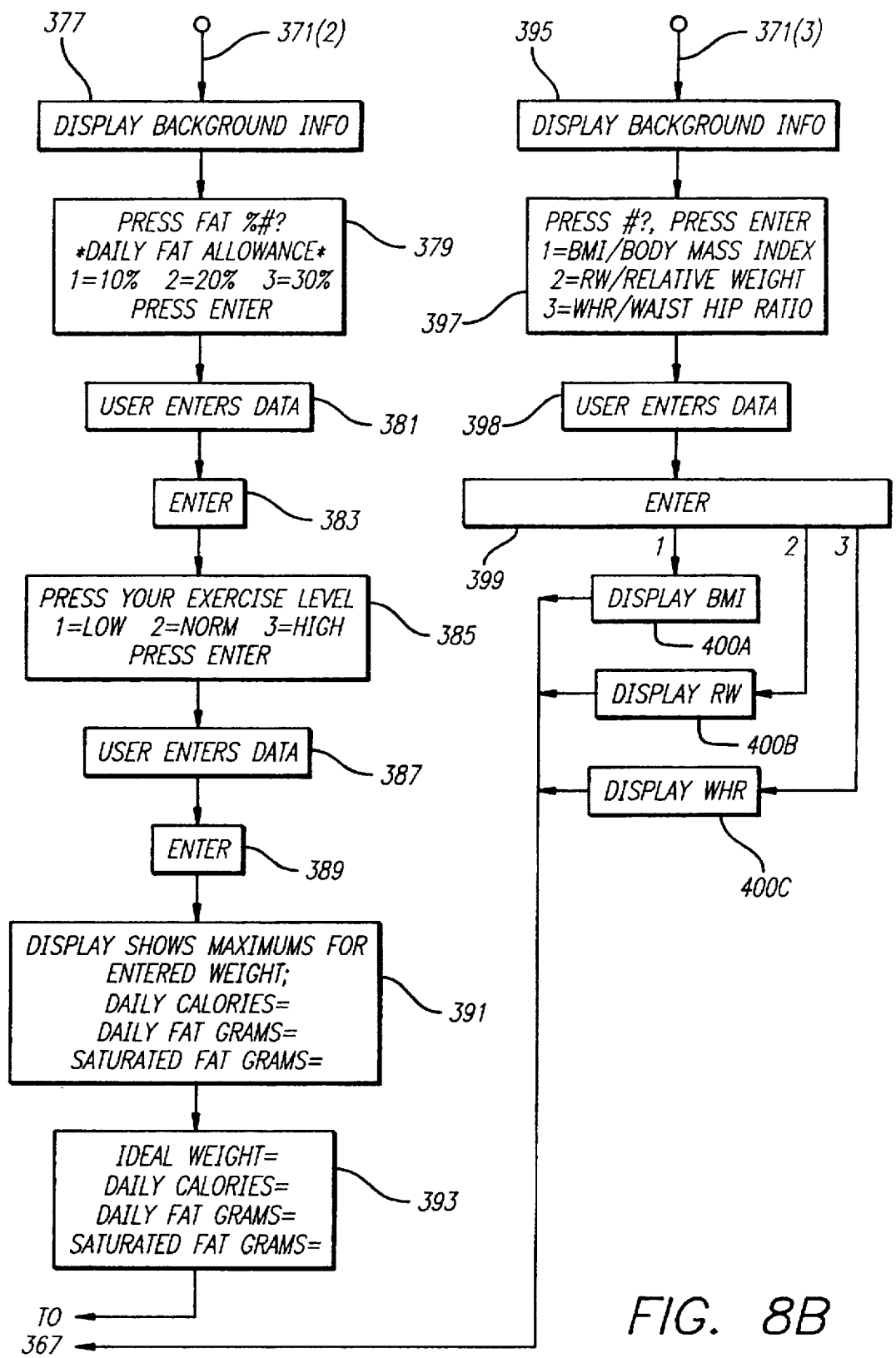

FIGS. 8A and 8B together are a flow chart of the operation of the system for the selection of the second program (home test). Before entering into a discussion of the flow chart of FIGS. 8A and 8B, it should be noted that the calculator 11 of FIG. 4 stores various mathematical constants, equations and algorithms, in addition to the number "9" and the number "100%" mentioned previously. This information includes a conversion from pounds to kilograms for weight entered into it by the user, and includes a conversion from height in inches to meters for use in a calculation of body mass index (BMI), which is calculated by dividing the weight in kilograms by the height squared in meters. For a display of ideal daily calories, various multipliers are entered, depending upon the entered exercise level (more fully explained later) for both male and female. The system is programmed to operate with three exercise levels, namely "low", "normal" and "high". The respective multipliers for determining daily calories for a male are 14, 15 and 16 and for a female are 12, 13 and 14 for these three exercise levels. Daily calories then are computed automatically by the calculator system 11, which multiplies the entered weight by the one of these multiples determined by the entered exercise level.

To determine the daily fat grams, the equation multiplies the daily calories times the fat allowance percentage and divides the result by 9. The system is programmed to provide three fat allowance selections, which are 10%; 20% and 30%, respectively, and which automatically select corresponding saturated fat allowances of 4%; 7% and 10%, respectively.

For computing an output of saturated fat grams, the daily calories are multiplied times the selected saturated fat allowance and divided by 9. The determination of saturated fat calories is calculated by multiplying saturated fat grams times the constant 9.

The equation for calculating lean body weight automatically functions to multiply the user entered weight in pounds times 1.08, from which is subtracted a number corresponding to the waist measurement in inches (entered by the user) times 4.15 plus a constant. The constant is 76.76 for females and is 98.42 for males. An automatic calculation of fat weight is made by subtracting the calculated lean body weight from the total weight. A percentage of body fat is determined by dividing the calculated fat weight by the total weight entered by the user. All of these calculations are automatically effected from the data entered by the user. No mathematical calculations of multiplication, addition, subtraction or division are made by the user of the calculator system.

The system is also programmed to calculate ideal weight based on the formula of dividing the lean body weight (calculated as above) by 1 minus an ideal constant. This constant is selected in accordance with age and differs for male and female, as well as age. For females below the age of 30, the constant is 0.175, for age 30–39 the constant is 0.185, for ages 40–49 the constant is 0.195, for ages 50–59 the constant is 0.205, and for ages over 60 the constant is 21.5. For males, a similar constant is determined; but the values are lower. For males under age 30, the "ideal" constant is 0.125, between ages 30–39, it is 0.13, between ages 40–49, it is 0.15, between ages 50–59, it is 0.16 and over age 60, the ideal constant is 0.17.

A determination of an ideal waist is made in accordance with the formula:

$$\left[ 1.08 - \frac{(1 - \text{ideal}) \times \text{ideal weight} + \text{constant})}{4.15} \right]$$

where "constant" is the male or female constant of 76.76 or 98.42 mentioned previously.

A calculation of "desired weight" is accomplished for entry of an age under age 34 by multiplying 4.58 times the height (in inches) and subtracting 152.9. For users over age 34, the desired weight is calculated by multiplying 4.18 times the height (in inches) and subtracting 139. A determination of a factor called "relative weight" is made by dividing the actual entered weight in pounds by the desired weight calculated above. The system also calculates a waist/hip ratio (WHR) by dividing the entered waist measurement by the entered hip measurement.

For a display of a warning signal or warning indication on the body mass index (BMI) a calculated value between 12 and 24 is considered normal. Between 25 and 27 is considered mild, anything over 27 signifies increased obesity related health risks, with 28 to 30 being moderate and 31 to 99 being severe. For RW/relative weight, 80% to 120% is considered normal, 121% to 140% is considered mild, 141% to 200% is considered moderate, and over 200% is considered severe. For the waist to hip ratio (WHR) in a male, 1.0 or less is considered normal and over 1.0 is considered obese. For a female, 0.8 or less is considered normal and over 0.8 is considered obese. Finally, the system is designed to produce an indicia that if the saturated fat percentage exceeds 10% it is "high" and that if it is equal to or below 10%, it is "low".

This home test program is selected at the prompt from block 148 described previously. If the number "2" is entered by the user, from the keypad 23 at the prompt of block 148, and then is entered, the calculator system 11 switches to the second program mode. FIG. 8 then shows the flow chart for the operation of the program in this mode. After the program has been entered, the initial operation of the program is to display a sequence of background information on the display panel 19. This information is presented on a sequential series of screens to explain the nature of the various home tests and the reasons for these tests. For example, the screens provide information that the home test mode of operation is a self-analysis and risk evaluation of information to provide a fat awareness. A warning is presented that the home test is not meant to replace medical advice, but that it is to monitor excess body fat percentages and weight for adjusting the fat/calorie daily allowance. Warnings also are presented to the user that when a high risk is indicated, a physician should be consulted. The statement then is made that the body composition consists of bone, muscle, water and fat; and a warning that fat, in particular, presents a problem. Successive screens state that the tests are to be used as guidelines to reach realistic midrange goals, and that evaluations may vary with like individuals due to differences in body structure. The background screens warn that the self body tests are estimates only, and they may not be exacting; but they establish a starting point to get the user moving in the right direction. Other screens state that by frequent testing and comparing changes in evaluation, the user can track progress.

At the end of this sequence, the display prompt 349 (FIG. 8) is shown. The user then presses either the number "1" or the number "2" to designate whether the user is a female or male. The number which is entered by depression of the appropriate key 29 on the keypad 23 is displayed at 341 and the Enter key 31 is depressed at 353 to enter the data. As noted previously, the depression of the Enter key at 351 is desired; but it is optional. The entered information can be automatically entered by the system of FIG. 4 after a pre-established time interval if the system is so programmed. Obviously, if an erroneous entry is made, depression of the Clear key 26 can clear the information to permit selection of the correct information.

Whether the information is automatically entered or is entered by depression of the key 31 at 353, the next display is a prompt at 355 requesting entrance of the age in years, weight in pounds, and height in inches. When the female/male entry is made, appropriate commands are supplied to the memory 73 of the system for lookup tables including age, weight, height information used in the calculations and equations described above. This information is stored in the memory 73 and is enabled for access for comparison purposes by the calculator of FIG. 4 when the appropriate selection is made at 351, described above. In response to the prompts at 355, the user enters the requested data by operating the appropriate keys 29 on the keypad 23. After each entry, the Enter key 31 is depressed at 359. This information then is sent to the memory 73 and the command and control unit 130 of the calculator system for subsequent computations and comparisons in the system.

Following entry of the age/weight/height information, another display prompt 361 is presented on the display screen 19. This prompt requests the user to enter the waist measurement in inches and the hip measurement in inches. The user enters this data at 363 in sequence; and the data is displayed on the panel 19. When the user is satisfied that the data is correct, it is entered at 365, which then causes another prompt to be displayed at 367. This prompt directs the user to enter one of three choices, namely "1" for weight analysis, "2" for daily calorie allowance and "3" for an analysis of health risk tests. The selection which is made is displayed at 369 and then is entered at 371 by depression of the Enter key 31.

As shown in FIGS. 8A and 8B, the system then operates in response to the entered data in different manners, depending upon the selection made. This is indicated in three parallel paths from the enter stage 371. If "1" (weight analysis) is selected, a sequence of background information on successive screens is presented at 373. Essentially, this information states that the weight analysis estimates the body fat percentage and the current and ideal (desired) weight. Statements are made that the purpose of this analysis is for tracking weight, waist, and body fat percentages for loss or gain. Additional statements are displayed on the display 19 that periodic body tests thus make it easy to monitor changes and to check progress.

Following this sequence of displays on the display panel 19, a final display at 375 shows the entered weight, which the user entered at 357, and then, based on the stored information in the memory 73 for calculations of age/weight/height information which is entered at 357, the system calculates the lean body weight and fat weight and divides the fat weight by the entered weight to display the percent of body fat, based on the user entered information. Immediately following this screen, another display screen is presented on the display panel which indicates, for the user entered data, the ideal weight (based on age and height), the ideal body fat percentage for a person of that age and height, and an ideal waist measurement for a person of that age and height. Clearly, the user can readily compare this information with the actual statistics which were entered at 357, described previously. Following the display 375, the system returns to the display prompt 367; so that a different one of the options available at 367 may be selected if desired.

If the second option at 367 is selected and then entered at 371, again, a series of background information screens 377 initially are presented. These screens indicate that the body fat percentage establishes a desired or ideal weight in order to determine the daily calorie allowance and fat allowance; and this is followed by a prompt that, for personal weight and health needs, the desired daily fat percentage allowance should be selected. Following this, a display prompt at 379 is presented for the user to select his or her desired daily fat allowance. The percentage allowances are shown in three different groups, namely "1" equals 10%; "2" equals 20%; and "3" equals 30%. In response to this prompt, one of these three numbers is entered; and this information is supplied to the memory 73 in the command and control logic 130 of the system of FIG. 4 for utilization in subsequent calculations.

Following display of the entered data at 381 and entrance of that data by depressing the Enter key 31 at 383, another display screen 385 is presented. This display indicates three different exercise levels, namely "1" equals low; "2" equals normal; and "3" equals high. These are presented and are internalized in the calculator to determine a general rate of calorie burn off of the user. Obviously, more calories can be tolerated at high exercise levels than at low exercise levels.

This information is translated in the command and control logic 130 of the calculator system into the different multipliers, described above, to be used for determining maximum calories which may be consumed by the user entering the data. Once the exercise level is selected by depression of the suitable key 29 on the keypad 23, the represented information is supplied to the control logic 130 by depression of the Enter key 31 at 389. The system of FIG. 4 then calculates the maximum calories for the weight which was entered at 359 and, based on the multiplier provided by the selected exercise level. For example, for a normal exercise level of a male, the multiplier 15 is used to multiply the body weight to obtain the total number of maximum daily calories which should be consumed by that person. The display of these maximum calories is made at 391. The calculator system of FIG. 4 also internally multiplies the maximum daily calories by the selected number of daily fat allowance which was entered by the user in response to the prompt 379. This is a user-selected number, which is supplied to the command and control logic 130 and which then is multiplied times the calories and is rounded off and divided by 9 in the algorithm of the command and control logic 130 to present the maximum daily fat grams which should be consumed as part of the daily calories which are presented. In addition, the system calculates the saturated fat grams based on this information.

By way of example, assume that the weight entered for a male is 132 pounds, and that a normal exercise level is selected. As stated above, the multiplier to determine the maximum daily calories is fifteen, which results in a display of maximum daily calories of 1,980. If the daily fat allowance which was selected is 10% (selection of number "1" at prompt 379) 198 calories out of the total daily calories are considered to be available for the selected fat calorie allowance. This result is divided by 9 to obtain the daily fat grams, which in this example is 22. The command and control system 130 then multiplies the calculated fat grams by 40%, which is utilized in the algorithm of the command and control logic 130 of the system of FIG. 4 to determine the saturated fat grams. This number is rounded off to the nearest number and results in a display of saturated fat grams of 9 for the example under consideration.

Immediately following this display, a second display of the ideal weight for the age/height/sex entered in response to the prompts 349 and 355, based on the above described information stored in the memory 73, is displayed. For the exercise level and the fat allowance percentages which have been entered in response to the prompts 379 and 385, the system calculates maximum daily calories, fat grams and saturated fat grams in the same manner described above. Following these displays, the system returns the display panel 19 to the prompt at 367, in the manner described previously.

If in response to the display prompt 367, the option number "3" (health risk tests) is selected, this is done at 395, and is followed by a screen on the display panel 19 which indicates that fat/weight risk tests, body mass index (BMI), relative weight (RW) and waist/hip ratio (WHR). Following this information, a display prompt at 397 is made directing the user to select one of these three options, namely "1" equals BMI, "2" equals RW, and "3" equals WHR, as defined in the screen immediately previous to this prompt. The user selects one of these three numbers by depressing the appropriate key 29 on the keypad 23. Following the display of the user entry, the Enter key 31 is depressed to enter the data. The information stored in memory 73 for age/weight/height then appears in the corresponding display screen 400A, 400B or 400C. If "1" is selected, information is displayed providing "Your BMI Estimate Equals" and then indicating the normal range for direct comparison by the user. This automatically is calculated by the formula described above. An additional screen may be displayed on the panel 19 after this information indicating that a BMI over 27 may signify elevated obesity-related health risks.

At this point, the system automatically returns back to the display prompt 397 and selection of one of the other options may be made. If number "2" is selected (RW), a pair of background information screens initially are presented at 400B. The first of these screens states that your weight is compared to national averages and indicates that this is an obesity fat test. The second screen then is a display of the user's RW health risk rating, and provides the RW estimate based on the weight entered at 359 in response to the prompt 355, as stated earlier. The relative percentage is provided, as is an indication of a normal range. Following this display, the system automatically returns back to display prompt 397.

If number "3" is entered at 399 in response to the prompt 397, the WHR or waist/hip/ratio is selected. Immediately following this selection, a screen at 400C provides the background information that this measurement is one of excess belly fat, and that it is an obesity fat test. Based on the information previously entered, the calculator system of FIG. 4 divides the waist measurement by the hip measurement to obtain the ratio which is displayed. The display further states that numbers under 0.8 (for women) or under 1.0 (for men) are normal. Sequential informational screens then follow this display stating that hazardous central fat in great excess can indicate elevated fat health risks. The user can turn the calculator 11 off or depress the Program Select key 33 to return the system to the initial program select at 148 to utilize any of the programs described above. If no further use of the calculator 11 is required, the on/off key 25 may be depressed, or as previously described, the calculator automatically turns itself off if no entry is made for a predetermined period of time.

Figure 9:
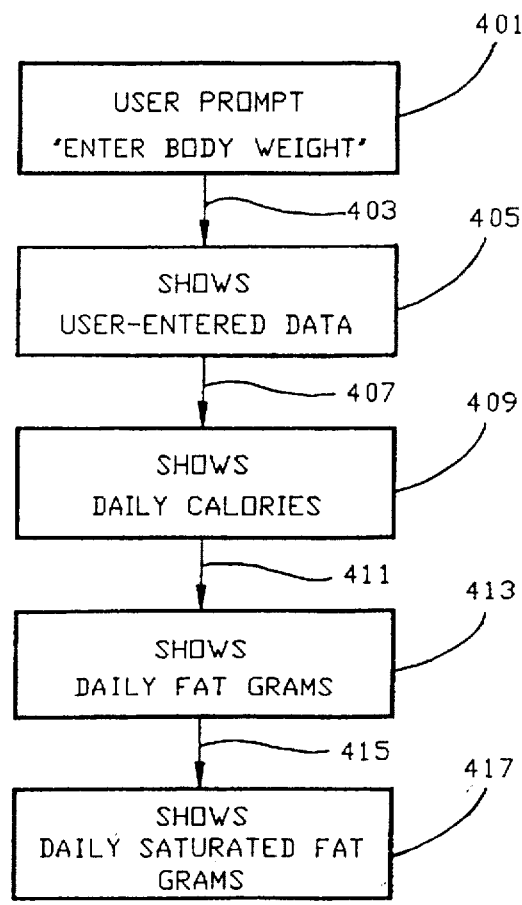
FIG. 9 is a generalized block diagram showing the user prompts and final results of a portion of the second program of FIGS. 8A and 8B.

FIG. 9 shows a sequential simplified block diagram which broadly shows the data or information displayed on the display screen 19 of the calculator 11 for the operation of the "Home Test" program or program number 2. In FIG. 9, block 401 is shown as indicating that the user prompt "Enter Body Weight" is displayed on the display panel 19 of the calculator of FIG. 1. Flow arrow 403 then connects to block 405 which shows that the user has read the user prompt of block 401, and has entered either is or her present actual body weight or his or her desired body weight on the keys 19 on the keypad 23. After the user-entered data has been verified and transferred to memory, it is recalled and reused such that the body weight is multiplied by a fixed constant (such as 15 in the above example) to get the total daily intake allowance of calories. Flow arrow 407 goes to block 409 and the first final answer is displayed on the display panel 19. Next, flow arrow 411 proceeds to block 413 and, after the daily calories have been multiplied by fifteen and then divided by 9, the total daily intake allowance of fat grams is displayed, as indicated in block 413. Finally, flow arrow 415 goes to block 417, which shows that the total daily intake allowance of fat grams is multiplied by 40% to get the total daily intake allowance of saturated fat grams which is shown on the display panel 19 for user edification purposes.

It will be understood by those skilled in the art that the calculator housing shown in FIG. 1 is only the preferred embodiment of the present invention, and that almost any size and shape of housing can be used for the calculator so long as it is relatively small, compact, lightweight and can be readily held in one hand while it is operated by the other hand. As previously stated, the transfer of user-entered and user-verified data from the display panel to the memory for storage therein can be effected either by use of a user-operated Enter key on the keypad of the calculator, or it can be effected automatically if the computer detects that no new data has been entered by the user for a predetermined period of time after it is initially displayed. Further, it will be understood that both the warning indicator light or LED and the audio alarm signal generator, or both, are optional only, and the combination of the displayed alert and/or alarm message together with intermittently flashing or blinking the display panel on and off represent the preferred embodiment. Still further, the power "on" indicator light or LED is also an option.

The warning or indicator light or LED may simply be turned on to indicate the existence of an alert or alarm state or condition, or it can intermittently be flashed, blinked, or turned on and off to indicate the alert or alarm condition. Likewise, the audio alarm signal generator may produce and enunciate any conventional audio alarm signal such as a siren, a klaxton, a wailer, a beeper, or the like.

It is to be understood that the particular type and size of the display panel is relatively unimportant so long as it is capable of visually displaying the longer of the longest user prompt and the warning message. In the dual function or dual purpose version of the calculator, it is pre-programmed, usually at the factory, to contain in its memory both a first program or Program "A" for computing the percentage of fat calories per serving in the given food item under evaluation and a second program or Program "B", which solves for the total daily intake allowance of calories, fat grams and saturated fat grams required or needed for low fat consumption and/or for maintaining a user's present body weight or for enabling a user to lose a given number of pounds on a weight reduction program. The case of two separate programs, the user can select the desired program either by use of the optional program selection switch or key on the keypad; or the system can be designed to enable the user to select program "B" with one of the on/off or the Enter key if the calculator is wired to automatically select program "A" when the power is turned on, and then switch to program "B" when the user activates the on/off key or the Enter key before entering any data. It should be noted that the actual wording of the user prompts and the actual wording of the alert or alarm message does not matter so long as the words or symbols used actually convey the gist of the meanings thereof.

It also should be noted that applicants are striving to make the present calculator and keypad or keyboard as simple and easy to use as possible. Nearly all of the sometime confusing keys usually found on a conventional four-function calculator have been eliminated. No longer does the user have to find and actuate the keys for such mathematical functions as addition, subtraction, multiplication, division, equals, etc. All mathematical operations in the present invention are pre-programmed into the memory via the programs, and all that the user has to do is enter minimal numerical values on the set of ten numerical data entry keys. This simplicity makes the present system far superior to the relatively complex, difficult to operate, difficult to understand calculator systems of the prior art, all of which relate generally to calories and not to total body weight calories, fat grams, saturated fat grams or percentage of fat calories, etc.

Programs "A" and "B" are typically pre-programmed or burned-in at the factory using convention PROM or EPROM memory chips or devices, although these programs could also be stored in other conventional memories such as ROMs, RAMs, etc.

Finally, the calculator system of the present invention was designed primarily for use at the point of purchase of food items or food products, i.e. at the place where it is most logical to make healthful, low fat purchasing decisions, such as in the grocery store, the shopping mall, the convenience store, the discount food center, the local food market, or anywhere that food items or food products are sold, since good nutrition begins in the marketplace. However, it will be realized that this calculator and its method can be used substantially anywhere, such as at home where food consumption actually occurs. On the other hand, the embodiment of Program "B" can also be used almost anywhere, but finds its primary use at home where the personal daily intake allowance decisions usually are made for meal planning purpose, dietary regimes, or the like.

Today, most medical experts agree that our fat intake, and even more importantly, our intake of saturated fat grams not only contribute to the obesity that threatens our nation today but also to other life-threatening diseases, illness and medical problems which can be directly medically linked to high fat intake, and again more importantly, to the intake of saturated fat grams. Some of these fat-related, life-threatening medical problems include heart disease, stroke, hardening of the arteries, gall bladder problems, high cholesterol problems, diabetes, cancer, obesity, certain emotional disorders, high blood pressure and many other medical problems, illness and diseases too numerous to mention, including wherever a positive link has not been firmly established, but is of suspect.

More and more people are finally taking heed of the warnings of medical experts and doctors everywhere, and of such prestigious organizations as the American Medical Association, the American Cancer Institute, the American Diabetes Institute and others. Studies have not positively established that it is no longer calorie intake alone which must be controlled, but more so our intake of fat and saturated fat. The best measure of our fat intake is in terms of the percentage of fat calories per serving in each food that we buy or eat, and furthermore, it is the most realistic approach one will adhere to.

However, until the present invention, there simply was no quick and easy system or method for converting the number of fat grams per serving, which appears on the food item's package, on its label, or on the food item itself, as required by the United States government, to the all-important critical percent of fat calories per serving. Since it is difficult, complicated and time consuming to do it by hand, the majority of Americans have simply not adopted this medically proven and highly endorsed system. Furthermore, using a standard, conventional four function calculator and trying to remember a mathematical formula is still extremely complicated, confusing and time consuming so that only a relatively few people have adopted the percentage of fat calories versus the old fashioned, outmoded and disproven calorie counting approach toward dieting. Therefore, fat control is very important for healthful weight control, weight reduction, better health and quality longevity.

Therefore, it will be recognized by all of those of ordinary skill in the art that various modifications, variations, substitutions and changes can be made, including the like alterations, display format and additions, program, along with the form, housing, structure, design, detail, function, keypad, electronics, memory, numerical formulas and method of the present invention for achieving like results, without departing from the spirit and scope thereof, which is limited ONLY by the appended claims.

What is claimed is:

1. A relatively small, compact, portable hand-held, multi-purpose, dedicated dietary fat control automatic calculator system for calculating the percentage of fat calories per serving of a given food item, including in combination:

a memory for storing user entered data, at least first and second operating programs, and a plurality of user prompts for at least said first operating program comprising 1) "enter fat grams"; 2) "enter saturated fat calories"; and 3) "enter calories";

a keypad for enabling a user to enter numerical data into said memory, and for selecting one of said operating programs;

a display for visually displaying information to the user;

a command and control circuit for executing said selected program, performing mathematical calculations, and generating control signals;

a logic circuit in said command and control circuit and coupled with said keypad for causing said command and control circuit to operate said selected program in response to entry of numerical data on said keypad following each of said user prompts, said command and control circuit coupled with said display for displaying information corresponding to said selected program and numerical data entered on said keypad; and an alarm circuit responsive to said command and control circuit for producing alarm signals in response to predetermined combinations of numerical data supplied from said keypad to said command and control circuit for said selected first program indicative of the percentage of fat calories per serving exceeding a predetermined amount.

2. The calculator system according to claim 1 wherein said alarm circuit supplies an alarm message to said display.

3. The calculator system according to claim 1 further including a visual indicator coupled with said alarm circuit and operated thereby to produce a visual alarm signal.

4. The calculator system according to claim 1 further including a loudspeaker coupled with said alarm circuit for operation thereby.

5. A circuit comprising a hand-held calculator system to enable a user to evaluate a given food item to determine its percentage of fat calories per serving, said system including in combination:

a keypad for supplying user entered numerical data in response to user prompts;

a memory;

command and control logic circuitry including a stored program for calculating the percentage of fat calories per serving and coupled with said memory and said keypad for operating said program in response to information stored in said memory and numerical data supplied from said keypad;

a display panel coupled with said command and control circuit for displaying information supplied thereto from said command and control circuit, said command and control circuit supplying successive user prompts for 1) "enter fat grams"; 2) "enter saturated fat calories" and 3) "enter calories" to said display panel from said memory;

said command and control circuit operating in response to data supplied from said keypad following display of each of said user prompts for transferring user entered data to said memory for storage therein;

a logic circuit in said command and control circuit coupled with said memory for retrieving at least user entered data from said memory, said logic circuit operating to compute predetermined mathematical information in a predetermined sequence in response to data supplied from said keypad following said user prompts with said logic circuit coupled with said command and control circuit for causing the storage of intermediate computational results in said memory and for causing the display of the percentage of fat calories per serving on said display panel.

6. The calculator system of claim 5 wherein said intermediate computational results include three subequations comprising:

(1) the number of grams per serving in the food item under evaluation times the mathematical constant "9" to yield an intermediate mathematical RESULT 1;

(2) the intermediate RESULT 1 divided by the total number of calories per serving in the given food item under evaluation to yield a second intermediate RESULT 2; and (3) the second intermediate RESULT 2 times 100% to produce the percentage of fat calories per serving contained in the given food item under evaluation for display on said display panel.

* * * * *